O. G. CRITCHETT.
Heel Cutting Machine.
No. 4,724. Reissued Jan. 30, 1872.
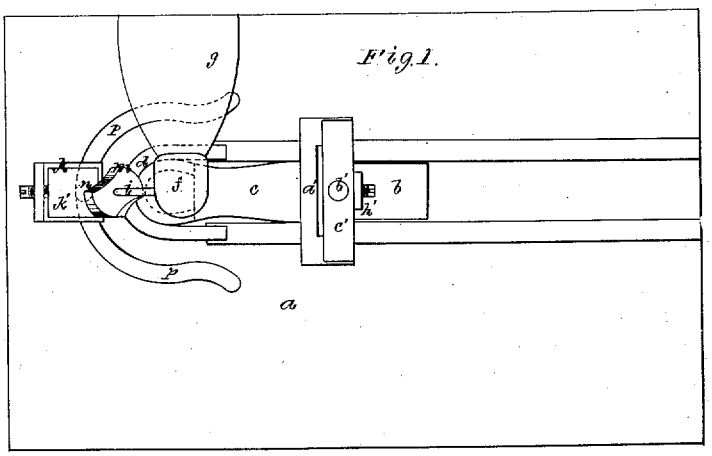
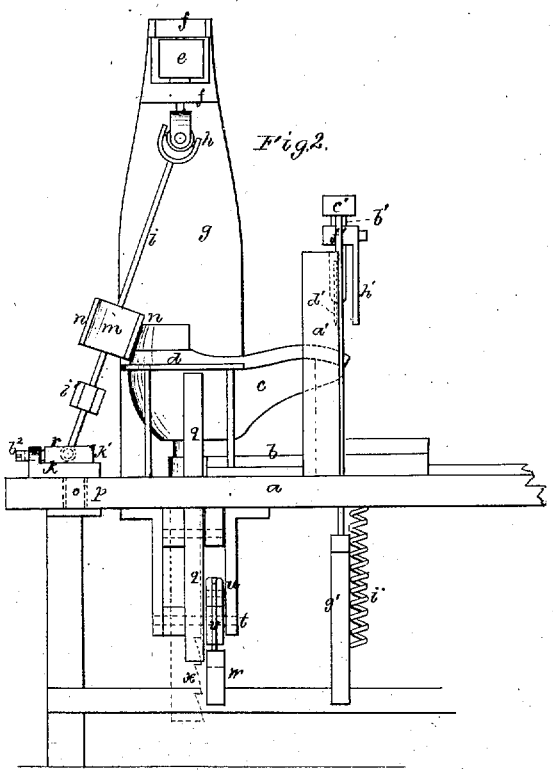
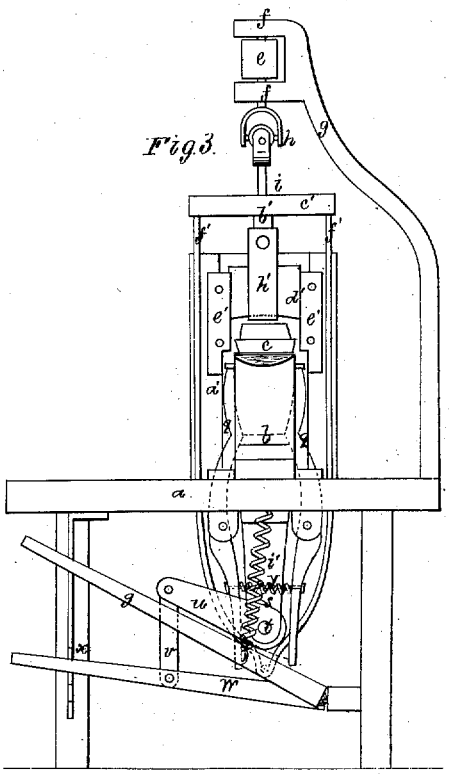
Witnesses.
Wm. Came
F. C. Hale
Oliver G. Critchett.
by his attorney.
F. P. Hale

UNITED STATES PATENT OFFICE.

OLIVER G. CRITCHETT, OF STONEHAM, MASSACHUSETTS, ASSIGNOR TO DAVID WHITTEMORE.

IMPROVEMENT IN HEEL-CUTTING MACHINES.

Specification forming part of Letters Patent No. 43,183, dated June 21, 1864; reissue No. 4,724, dated January 30, 1872.

*To all whom it may concern:*

Be it known that I, OLIVER G. CRITCHETT, of Stoneham, in the county of Middlesex and State of Massachusetts, have invented an Improvement in Heel-Cutting-Machines; and I do hereby declare that the following, taken in connection with the drawing which accompanies and forms part of this specification, is a description of my invention sufficient to enable those skilled in the art to practice it.

This invention relates to the construction of machinery for trimming the heels of boots and shoes; and my improvement consists in the arrangement of a rotary cutter-cylinder to move around the heel while the boot or shoe is jacked or held stationary, the plane of movement of the cutting-face of the cutter-cylinder being made to accord to the contour to be given to the edge of the heel, as will be described. The invention further consists in the employment, in combination with a jack or carriage upon which the shoe is fastened or supported, of a vertical knife to cut down or trim the front edge of the heel.

A machine embodying my improvement is represented in the drawing, Figure 1 showing a top view, Fig. 2 a side elevation, and Fig. 3 an end elevation of the same.

*a* denotes a table, upon which a carriage, *b*, to which the shoe *c* is jacked, slides horizontally; *d*, a guide-plate or frame, secured at such height above the table *a* as to come just in line with and so as to extend around the lower edge of the sole of the shoe under the heel when the carriage *b* is run up into the position shown in the drawing. A drum or pulley, *e*, rotates in bearings *f* on the top of a standard, *g*, and the bottom of the shaft of this pulley is connected by a universal joint, *h*, to a long shaft, *i*, journaled at its lower end by a ball-and-socket joint, *r*, to a sliding plate, *k*. This shaft bears the cutter-cylinder *m*, carrying any suitable number of cutters or knives *n*.

The cylinder is made to move around the heel, and according to the form of the heel, as follows: The plate *k* rests upon the table *a*, and has one or more friction-rolls, *o*, projecting from its lower surface through a cam or pattern-groove, *p*, in the table *a*. This groove is of such form or curve that movement of the slide-plate *k* around it brings the cutting-edge of the knife *n* as it rotates into such position with respect to the heel as to cut the heel to proper shape. Rotation of the drum *e* drives the cutter-cylinder *m*, and the joints *h* and *r* permit lateral movement of the cylinder *m*, such movement being controlled by the groove *p*. To hold the shoe firmly in position while the heel is being trimmed there are two jaw-levers, *q*, passing through and jointed to the table *a*, the lower ends of the levers being spread apart to cause the jaws to grasp the shoe by means of a cam, *s*, on a shaft, *t*, which shaft is connected by an arm, *u*, and link, *v*, to a treadle-lever, *w*. Depression of the treadle forces the cam against the inner faces of the jaw-levers and brings the jaws against the shoe, the treadle being kept in position by the teeth of a rack, *x*, or other suitable means, and when the treadle is released a spring, *y*, draws the lower ends of the levers toward each other and the jaws away from the shoe.

Having described the mechanism for giving form to the edge of the heel, I will next describe that for finishing or cutting off the front part thereof. When the heel has been trimmed the carriage *b*, on which the shoe is supported, is drawn forward under a knife-frame, *a'*. To a vertical arm or rod, $b^1$, depending from a cross-head, *c'*, a knife, *d'*, is fixed, said knife sliding vertically on ways *e'*. The cross-head is mounted upon the tops of vertical sliding rods *f'*, which descend through the table *a* and are fastened under the table to a treadle, *g'*. The movement of the knife *d'* is in a plane at right angles to the line of movement of the shoe-carriage, so that, when the knife is brought down by the depression of the treadle *g'*, it cuts the heel square across the shoe. To regulate the depth of the cut, or to prevent the knife from cutting into the sole of the shoe, a stop-plate, *h'*, is fastened to the rod $b^1$ by an adjusting-screw. This stop-plate moves up and down with the knife, and is so adjusted with respect thereto as to strike upon the sole of the shoe when the knife has cut to sufficient depth or through the heel, thus arresting further progress of the knife. The rise of the knife is effected by a spring, *i'*, as will be readily understood.

2

I would remark that, although I have described the mechanism for forming the edge of the heel and that for finishing or cutting off the front part thereof as combined or affixed to the same frame or table, they may be affixed to separate tables or supports and used independently, each mechanism being perfect in itself, and performing its function without aid from the other.

The cam-groove, instead of being formed in the table *a*, may be made in a piece which rests upon the table, and is detachable therefrom, so that the shaft and cutter may be guided in different paths suited to the trimming of heels of different contours. The piece *k'*, which bears the ball-and-socket joint of the shaft upon the carriage *k*, is made adjustable toward and from the heel, so that by adjustment obtained by means of the screw $b^2$ the heel may be trimmed to any desired size within certain limits. The guard-plate *d* may also be changed for others of various sizes; and it should be observed that the shoe ought to be so adjusted in height with respect to this guard-plate as not to expose above it any of the vamp. If the heel is nailed upon the shoe so as to be more upon one side than the other, the heel is brought so as to occupy a central position beneath the driving-shaft *i*, which fact is ascertained by measurement from some fixed part of the machine, or by correspondence of the top of the heel with some convenient removable gauge. The shoe, however, has, in such cases, to be moved a little to one side or the other, to accomplish which the hole for the pin entering the rear part of the last from the holder has to be slotted sidewise. The shaft *i*, being put in rotation, is drawn by the operator around the heel, force being applied for that purpose to any suitable handle, as shown at *i'*, for example, and the shaft being guided by the influence exerted on the bearing-carriage by the cam-groove.

It will be obvious that with this machine heels can be very rapidly and nicely trimmed, and to much better advantage than in machines where the shoe is carried around by hand or by machinery to the action of stationary knives, or of knives capable of rotation only on their own axes or on the axes of the cylinders upon which they are fixed.

Having described my invention, what I claim is as follows:

1. A heel-cutting machine composed of the following elements: first, a jack or carriage for supporting the shoe and maintaining its heel stationary; second, a cutter rotating on its own axis; and third, mechanism for causing the cutter to traverse around and form the contour of the heel, the whole being constructed, combined, and operating together substantially as above set forth.

2. The means for operating the cutter and causing it to traverse about a stationary heel, the same being the universally-jointed shafts and the cam-groove, arranged to operate substantially as specified.

3. The combination of the reciprocating cutter-carrier $b^1$, the knife or cutter *d'*, and the gauge *h'*, arranged and operating together substantially as set forth.

4. The combination, with the cutter-carrier $b^1$, the knife or cutter *d'*, and the gauge *h'*, of a jack or carriage for supporting a shoe, substantially as and for the purpose hereinbefore described.

OLIVER G. CRITCHETT.

Witnesses:
F. P. HALE,
F. C. HALE.